(12) United States Patent
Ausserlechner

(10) Patent No.: US 11,692,807 B2
(45) Date of Patent: Jul. 4, 2023

(54) SENSING OF A ROTATIONAL ANGLE

(71) Applicant: Infineon Technologies AG, Neubiberg (DE)

(72) Inventor: Udo Ausserlechner, Villach (AT)

(73) Assignee: Infineon Technologies AG, Neubiberg (DE)

(*) Notice: Subject to any disclaimer, the term of this patent is extended or adjusted under 35 U.S.C. 154(b) by 152 days.

(21) Appl. No.: 16/928,516

(22) Filed: Jul. 14, 2020

(65) Prior Publication Data

US 2021/0018309 A1    Jan. 21, 2021

(30) Foreign Application Priority Data

Jul. 19, 2019    (DE) .......................... 102019119664.7

(51) Int. Cl.
*G01B 7/30*    (2006.01)
*G01D 5/14*    (2006.01)

(52) U.S. Cl.
CPC .............. *G01B 7/30* (2013.01); *G01D 5/145* (2013.01)

(58) Field of Classification Search
CPC ......... G01D 5/145; G01D 5/2451; G01B 7/30
See application file for complete search history.

(56) References Cited

U.S. PATENT DOCUMENTS

| | | | | |
|---|---|---|---|---|
| 8,163,144 B2* | 4/2012 | Tilsch | ................. | H01J 37/3438 |
| | | | | 204/298.14 |
| 8,471,552 B2* | 6/2013 | Suzuki | ................... | G01D 5/145 |
| | | | | 324/207.21 |
| 8,607,650 B2 | 12/2013 | Antoni et al. | | |
| 2007/0242758 A1* | 10/2007 | Hoelzl | ................... | G01N 29/46 |
| | | | | 375/259 |
| 2010/0097057 A1* | 4/2010 | Karpen | ................ | G01N 27/904 |
| | | | | 73/632 |
| 2010/0109491 A1* | 5/2010 | Miyazaki | ............... | H02K 29/12 |
| | | | | 310/68 B |
| 2011/0167920 A1 | 7/2011 | Rink et al. | | |

FOREIGN PATENT DOCUMENTS

| | | |
|---|---|---|
| CN | 102045016 A | 5/2011 |
| CN | 102538838 A | 7/2012 |
| CN | 102889898 A | 1/2013 |
| CN | 104969036 A | 10/2015 |
| CN | 105765347 A | 7/2016 |

(Continued)

OTHER PUBLICATIONS

Infineon Technologies AG, "Out of Shaft with magnetic 3D sensor", Jul. 31, 2018, pp. 1-21.

(Continued)

*Primary Examiner* — Reena Aurora
(74) *Attorney, Agent, or Firm* — Harrity & Harrity, LLP

(57) ABSTRACT

A rotation angle sensing device is suggested, said device including: a magnetic field source that is mechanically coupled to a rotatable shaft; at least one conductive target that is mechanically coupled to the rotatable shaft; a magnetic angle sensor that is configured to detect the magnetic field of the magnetic field source; and at least one coil that is configured to excite an eddy current in the at least one conductive target and to receive a signal induced by the eddy current. Also, a corresponding method is provided.

29 Claims, 11 Drawing Sheets

(56) References Cited

FOREIGN PATENT DOCUMENTS

DE   102009033242 A1   1/2010
EP       3044550 B1   5/2019

OTHER PUBLICATIONS

Matija Podhraški and Janez Trontelj, "A Differential Monolithically Integrated Inductive Linear Displacement Measurement Microsystem", Senors, Mar. 17, 2016, pp. 1-20, DOI: 10.3390/s16030384.
Slawomir Tumanski, "Induction coil sensors—A review", Measurement Science and Technology, Jan. 19, 2007, pp. 1-14, DOI: 10.1088/0957-0233/18/3/R01.
Lin Ye, Ming Yang, Liang Xu, Xiaoqi Zhuang, Zhaopeng Dong and Shiyang Li, "Nonlinearity analysis and parameters optimization for an inductive angle sensor", Sensors, Feb. 28, 2014, pp. 4111-4125, vol. 14(3), DOI: 10.3390/s140304111.

* cited by examiner

SENSING OF A ROTATIONAL ANGLE

RELATED APPLICATION

This application claims priority to German Patent Application No. 102019119664.7, filed on Jul. 19, 2019, which is incorporated herein by reference in its entirety.

BACKGROUND

Principles of inductive sensors (e.g., induction coil sensors) are known.

In many applications it is not an option to directly access the end of a shaft for angle measurement purposes. As a solution, a magnetic 3D sensor can be used by measuring the X-Y (X-Z or Y-Z) components. The sensor is located out of the shaft, i.e., not on the rotation axis of the shaft. The shaft itself has a magnetic encoder with at least two poles (one referred as N, the other as S).

It is an objective to improve existing solutions for sensing of a rotational angle of a shaft.

SUMMARY

This is solved according to the features of the independent claims. Further embodiments result from the depending claims.

The examples suggested herein may in particular be based on at least one of the following solutions. Combinations of the following features may be utilized to reach a desired result. The features of the method could be combined with any feature(s) of the device, apparatus or system or vice versa.

A rotation angle sensing device is provided, said device including:
a magnetic field source that is capable of being mechanically coupled to a rotatable shaft;
at least one conductive target that is capable of being mechanically coupled to the rotatable shaft;
a magnetic angle sensor that is arranged to detect the magnetic field of the magnetic field source,
at least one coil that is arranged
to excite an eddy current in the at least one conductive target and
to receive a signal induced by the current.

The at least one coil may be arranged to remotely excite the eddy current in the at least one conductive target.

The at least one conductive target may be a piece or a portion of a target structure as described herein or it may be said target structure.

It is noted that the at least one conductive target may be directly or indirectly mechanically coupled to the shaft. The at least one conductive target may be coupled to the shaft itself, to a carrier or to the magnetic field source.

The conductive target does not have to be attached to the magnetic field source; it may suffice to have the conductive target coherently rotate with the magnetic field source. This may be achieved, e.g., by fixing the magnetic field source and the target to the (common) shaft.

It is further noted that the combination of magnetic and inductive sensor principle is favorable, because both use the magnetic field: a static portion of the magnetic field is used for the magnetic principle and a time varying portion of the magnetic field is used for the inductive principle. Both principles are rather robust against, e.g., oil, grease, moisture, or dust.

It is also noted that the magnetic field source may be arranged in a circular way around the shaft. It is an option that the magnetic field source includes several magnets that are deployed on a substrate or any support medium.

The magnetic angle sensor may be part of a package, which may be mounted on a printed circuit board (PCB).

The magnetic angle sensor may include at least two angle sensor elements that are arranged to detect different magnetic field components (of different directions).

In an exemplary embodiment, the magnetic field source may be a permanent multipole magnet, wherein several conductive targets are aligned with the poles of the magnet at a substantially constant azimuthal direction at a substantially constant radial distance and a substantially constant axial position.

According to an embodiment, the magnetic field source is fixed on the shaft and the magnetic field source includes at least one of the following:
a permanent magnet;
a ring magnet;
an injection molded ferrite.

According to an embodiment, the magnetic field source includes a dipole magnet or a multipole magnet.

In case the magnetic field source includes a dipole magnet, a full period of a single signal generated may correspond to a rotation of the shaft amounting to 360°. In case the magnetic field source includes a multipole magnet, several such full periods are generated per 360°-rotation. Also, a single conductive target (e.g., a conductive target structure including a single tooth) can be provided that allows generating a single period of a signal per 360°-rotation or several conductive targets (e.g., a conductive target structure including several teeth) can be provided that allow generating several periods of a signal per 360°-rotation.

According to an embodiment, the magnetic field source and/or the at least one conductive target are arranged to generate one or several periods of a signal per rotation of the shaft.

Hence, the magnetic field source and/or the at least one conductive target may be arranged such that one or several periods of a signal can be generated per rotation (of the shaft).

According to an embodiment, the at least one conductive target is arranged on a surface of the magnetic field source.

According to an embodiment, the at least one conductive target includes at least one of the following:
aluminum;
copper;
a sheet metal;
a plain piece of metal;
a metal shell;
a metal foil;
a coil including a wire and/or a conducting path with at least one loop;
an open or a closed spiral or loop.

The at least one target can be a rigid metal that is used as a fixture for the magnetic field source. It is in particular an option that the at least one target increases the mechanic stability.

It is also an option to injection mold the magnetic field source around the target to obtain a substantially smooth and uniform surface.

According to an embodiment, the at least one conductive target has a low magnetic susceptibility, in particular a relative permeability in a range between 0.9 and 1.1.

According to an embodiment, the at least one conductive target includes a tape or coating.

The conductivity of the magnetic field source may be significantly smaller (e.g., by a factor of at least 100) than the conductivity of the conductive target.

According to an embodiment, the at least one conductive target is glued or sprayed to a supporting structure coupled to the magnetic field source or to the magnetic field source itself.

According to an embodiment, the at least one coil includes differential coils.

For example, the inductive system (i.e. the at least one coil) may include two coil subsystems with identical turn-areas (i.e. product of number of turns and area of each turn), both subsystems may be connected in series but one flipped versus the other and placed aside so that the alternating current (AC) field does not induce any signal in the total coil system. Differential coils have lower electromagnetic emission compared to non-differential coils.

According to an embodiment, the at least one conductive target is aligned with regard to the magnetic field source.

According to an embodiment, the magnetic angle sensor is arranged to detect a spatial direction of the magnetic field applied to it by the magnetic field source.

The magnetic angle sensor may be positioned opposite of any surface of the magnetic field source, preferably at a small clearance (distance from the magnetic field source's surface). The at least one conductive target may be placed on or at this preferred surface or in the vicinity thereof.

According to an embodiment, the magnetic angle sensor includes at least one of the following:
a magnetoresistive (MR) sensor;
an AMR sensor;
a GMR sensor;
a TMR sensor;
a Hall plate;
a vertical Hall effect device.

The angle sensor may include at least one sensor element. The sensor element may be or include at least one of the following: an AMR (Anisotropic MR) sensor, a GMR (Giant MR) sensor, a TMR (Tunneling MR) sensor, a Hall plate or a vertical Hall effect device.

The angle sensor may be a sensor package, a sensor component board or a sensor module.

According to an embodiment, the at least one coil is driven by an alternating current (AC).

It is noted that the inductive system may be run with a signal having an AC frequency in the range from 1 kHz to 1000 MHz, in particular 4 MHz. It may be chosen such that it matches parameters of capacitances and coils in integrated circuit technology (e.g. silicon CMOS technology). The signal of the AC may be sinusoidal or it may be pulse shaped. The frequency may be fixed or it may alter periodically or according to a (pseudo-) random pattern.

According to an embodiment, the coil exciting the current in the at least one conductive target and receiving the signal induced is the same.

According to an embodiment, one coil excites the current in the at least one conductive target and another coil receives the signal induced.

According to an embodiment, the magnetic angle sensor and the at least one coil are arranged in a single package.

According to an embodiment, including a processing device that is arranged to combine the detected magnetic field and the received signal induced by the current to derive the rotational angle of the shaft.

The processing device may include at least one of the following: a processor, a microcontroller, a hard-wired circuit, an ASIC, an FPGA, a logic device.

Also, a method is suggested for sensing a rotational angle of a shaft that is arranged rotatably around a rotation axis, wherein a magnetic field source is capable of being mechanically coupled to the shaft, wherein at least one conductive target is capable of being mechanically coupled to the shaft, the method including:
detecting the magnetic field of the magnetic field source by a magnetic angle sensor,
exciting via at least one coil a current in the at least one conductive target;
receiving by the at least one coil a signal induced by the current.

According to an embodiment, the method includes:
combining the detected magnetic field and the received signal induced by the current to derive the rotational angle of the shaft.

Hence, a sensor package may be provided (e.g., in the vicinity of the magnetic field source), which may in particular include the magnetic angle sensor as magnetic field sensing device, the at least one coil and some circuitry. The sensor package is in particular arranged to
(i) detect the magnetic angle of the magnetic field generated by the magnetic field source,
(ii) drive an AC through the at least one coil,
(iii) detect the induced signal from eddy currents in the conductive target,
(iv) combine the readings of magnetic angle sensor and the induced signal to derive the rotational angle of the shaft.

It is noted that specific events in the signals (i.e. the readings of magnetic angle sensor and/or the induced signal) may be detected, e.g., zero crossing or rising edges or extrema. The rotational angle of the shaft may eventually be determined based on such events.

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Figure 1:
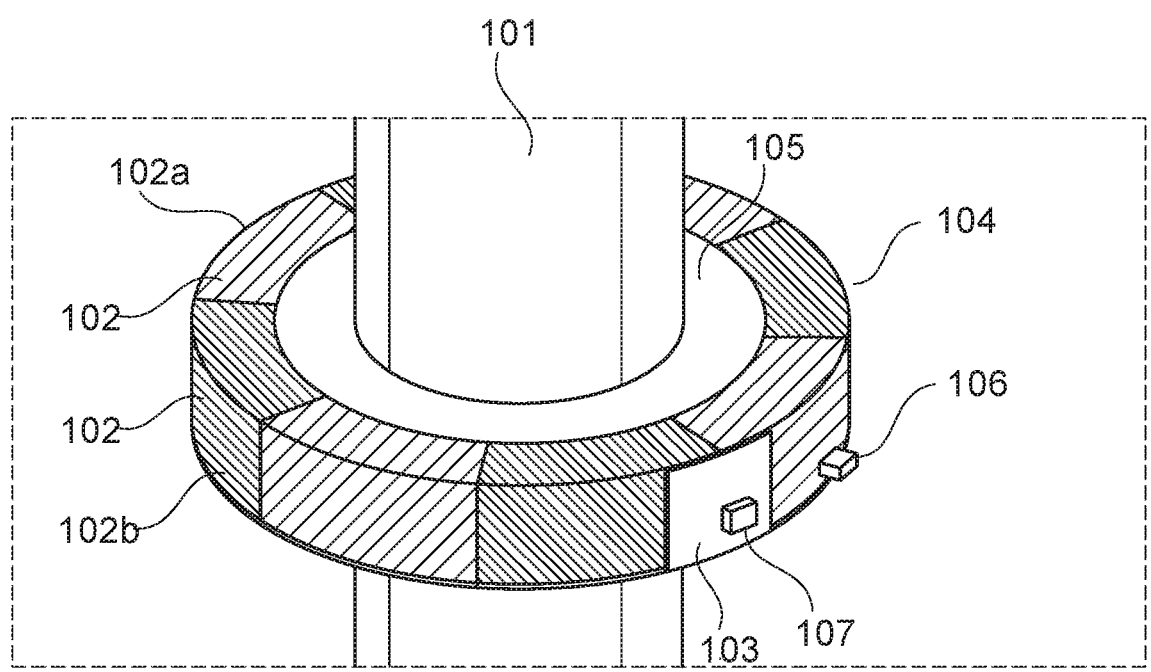
FIG. 1 shows a schematic arrangement comprising a magnetic field source, e.g., a multipole magnet, that is mechanically coupled to a shaft, which is rotatable around a rotation axis, and a conductive target (also referred to as "target"), which is mechanically coupled to the magnetic field source.

Through-shaft magnetic angle sensors have a long shaft with a ring magnet around it and a magnetic field sensor nearby. A sensor detects two magnetic field components B1, B2 and a magnetic field angle is computed based on a vector $$B1*n1+B2*n2$$

with n1 and n2 being unit vectors in directions 1 and 2. The directions 1 and 2 may be orthogonal or substantially orthogonal to each other. With regard to a cartesian coordinate system, the directions 1 and 2 may be selected from directions x, y and z.

It is noted that the sensor may comprise at least two sensor elements, wherein each sensor element may be directed to detect one of the directions. The sensor element may be implemented as a chip or die; the sensor comprising the sensor element may be supplied in a single package.

This magnetic field angle is related to the rotational position of the magnet. In an exemplary case, the rotational position of the magnet is identical to the magnetic field angle. However, it is also a possibility that there is a functional relation between the magnetic field angle and the rotation angle of the magnet. Such functional relation can be supplied using, e.g., a look-up table.

Dipole magnets provide a single N-pole and a single S-pole. Thus, the magnetic field pattern of the dipole magnet is substantially unique in the full range from 0° to 360°. However, the field pattern may suffer from a production spread, because the poles of the magnet are too large to be manufactured with a high degree of uniformity. Also, the magnetic field sensor may be imperfect which results in additional measurement errors.

Multipole magnets have p pairs of N- and S-poles. Therefore, the magnetic field angle rotates p*360° (this corresponds to a so-called electrical angle) if the magnet rotates only 360° (which defines the actual mechanical angle).

Consequently, the read out of the magnetic field angle sensor can be mapped unambiguously to the rotation angle of the shaft in an angle range of only 360°/p. For some applications this is sufficient (e.g., control of a motor with p pole pairs), but for other applications a higher resolution of the angle is required.

The advantage of multipole magnets is that errors of the sensor itself can be divided by the number p when the rotational position of the shaft is computed. Here, electrical angle errors can be reached below a range between 1° and 2°, which advantageously results in mechanical angle errors in a range between 1/p° and 2/p°. Assuming, e.g., a multipole magnet with p=5 pairs of N- and S-poles, a mechanical angle error in the order between 0.2° and 0.4° can be achieved.

An inductive angle sensor may comprise:
- a stationary coil system which is supplied with an alternating current (AC), and
- at least one rotatable conductive target which can be a piece of metal, a coil shorted with a low impedance load or the like.

The target may be a single piece or it may comprise a multitude of pieces (referred to as targets). The target may in particular be regarded as "target structure" comprising at least one target, in particular several targets. The target structure may be realized as a single piece or as a multitude of pieces.

The AC-magnetic field of the coils induces eddy currents in the target and these currents couple inductively into the coil thereby supplying an electromagnetic field. A circuit detects this induced voltage and derives the rotational position from an amplitude and/or frequency shift and/or phase shift of the induced signal.

The stationary coil system may comprise at least one coil. The coil may be large, e.g., placed on printed circuit boards encircling the shaft, or small, e.g., integrated on a chip.

The target may comprise a toothed wheel or some plate or drum with holes or it is simply a small aluminum tape which may be stuck to a plastic drum.

Advantageously, targets with p-fold rotational symmetry may be used, which make them ambiguous with regard to angles which differ by 360°/p. Usually the number p is at least three, but the accuracy of such system may decrease with p being either too low or too large.

It is hence in particular an objective to provide a solution to detect a rotational position of a shaft utilizing magnetic fields. The rotational position may be determined across the 360° range or in portions thereof.

Examples described herein are in particular cost-efficient. For example, a single magnet and a single angle sensor may be used. The sensor may in particular not require a loop that encircles the shaft.

Examples described herein in particular combine magnetic and inductive principles.

For example, a magnetic field source is fixed to a shaft that is rotatable around a rotation axis. The magnetic field source may be or comprise at least one permanent magnet. The magnet may be a multipole magnet or a dipole magnet. The magnet may be of rather poor electrical conductivity.

At least one (highly) conductive target may be fixed to the magnet. However, with regard to the system utilizing the inductive principle, it is advantageous that the eddy currents are predominately induced in the conductive target (not so much in the magnetic field source).

A sensor package may be provided (e.g., in the vicinity of the magnet), which comprises one magnetic field sensing device, an inductive loop and some circuitry. The sensor package is arranged to
 (i) detect the magnetic angle of the magnetic field generated by the magnet,
 (ii) drive an AC current through the inductive loop, and
 (iii) detect the induced signal from the eddy currents in the conductive target,
 (iv) combine the readings of magnetic angle and the induced signal to derive the rotational angle of the shaft.

The permanent magnet and its associated magnetic angle measurement system may be considered a first part (also referred to as main part) and the inductive circuitry and its associated target are considered a second part (also referred to as an auxiliary part).

However, this only serves as an example. It is also possible to consider the first part as auxiliary part and the second part as main part. It is noted that the magnetic angle measurement system can serve as main system or as auxiliary system, which also applies to the inductive measurement system.

It is in particular an option to have more than one system (be it the magnetic or the inductive measurement system or both) for diversification and/or redundancy purposes. It is noted that several systems providing information about the rotational angle of the shaft—even if such information is at least partially derivable from each of the measurement systems—may be used to increase the reliability and/or safety of the application.

In an exemplary scenario, the magnetic angle measurement system may be used to get angle readings φ' which run from 0° to p*360° for a full revolution of the magnet with p pole pairs. In this case, the magnetic angle measurement system does not provide an unambiguous angle reading, because an angle φ'/p differs from the rotational angle by n*360°/p with n=0, 1, 2, ... p−1. The inductive measurement system may thus help determining n. There are various approaches to achieve this objective, a few will be explained in more detail hereinafter.

Example: Single Target

A conductive target is provided as a single "tooth", which can be smaller than a (single) magnetic pole or it may be the size of half of the magnet (i.e. extending over 180°) or it may cover the entire magnet with exception of a small void.

In such case, the inductive system is used to define a reference angle: the inductive signal may show some marked behavior (i.e. it decreases abruptly) when the single target passes the induction coil.

The marked behavior of the inductive signal may preferably occur at an angular range less than a pole-pair size, i.e. less than 360°/p, because then the system is able to relate the inductive signal to the specific pole-pair and mark it with n=0.

The target may be placed on the magnet in such a position that for CW (clockwise) rotation the inductive feature occurs close to an angle φ' rising above 180° (and for CCW (counter-clockwise) rotation the inductive feature occurs close to the angle φ' falling below 180°). Then the number of rotations is increased by 1 (for CW rotation) or reduced by 1 (for CCW rotation) if the angle φ' jumps between 360° and 0° (if at that jump the rotation direction has not changed in the meantime). The counting up/down of n is done modulo p.

After power-up of the sensor system it may wait until the inductive signal is detected. Each time the inductive signal is detected the system initializes n=0. From the detected magnetic angles in the past the system knows the rotation direction (DIR=+1 for CW vs. DIR=−1 for CCW). Then the system computes the rotation angle as follows:

$$\varphi''=\varphi'/p+360°/p*DIR*n.$$

After each full magnetic period n is increased or decreased by 1 depending on the rotation direction DIR. FIG. 1 shows a schematic arrangement from above. It is an exemplary arrangement comprising a shaft 101 with a diameter amounting to 20 mm and a multipole magnet 104 with p=4 pole-pairs 102. The pole-pairs 102 of the magnet 104 are of equal size, wherein each single pole covers an angle of 360°/8=45°. Each pole-pair 102 comprises a pole 102a and a pole 102b. The multipole magnet 104 is a ring with an inner diameter of 30 mm, an outer diameter of 40 mm and an axial thickness of 7 mm.

The magnet 104 is attached to the shaft 101 via a holder 105.

A conductive target 103 (also referred to as "target") is made from 0.2 mm thick sheet metal and glued or (injection) molded to the magnet 104. It has a single tooth, which subtends the curved outer surface of the magnet 104 along its entire width of 7 mm with an azimuthal size of half a pole (i.e. covering an angle of 22.5° around the shaft 101). The center of the target 103 is aligned with a north-south transition of the multipole magnet 104. In other embodiments the target may be shifted by 11.25° CW or CCW so that the rising or falling edge of the target coincides with a N-S-transition of the multipole magnet.

Two sensor dies 106 and 107 (also referred to as "chips") are shown (each sensor die is also referred to as "sensor" or "sensor element") having an exemplary size amounting to 2 mm×1.5 mm×0.75 mm.

The sensor dies 106 and 107 are placed with 1.5 mm radial clearance to the magnet 104. This radial clearance to the magnet 104 results in a 1.3 mm radial clearance to the target 103. In this case the radial clearance between sensor die and magnet is 1.5 mm.

The sensor dies 106 and 107 have two different orientations, which indicate two exemplary orientations of sensor dies towards the magnet 104. Advantageously, both sensor dies 106 and 107 are placed with their gravity centers in the center plane of the magnet 104. Hence, some axial play of the shaft 101 may have no or only limited impact on the change of the magnetic and inductive signals detected by the dies 106 and 107.

It is noted that for a multitude of use-case scenarios, a single sensor die suffices. It is also an option that in case of using several sensor dies 106 and 107, these sensor dies 106 and 107 may have the same orientation towards the magnet 104. Insofar, the example of FIG. 1 shows merely one possible placement of two sensor dies 106 and 107.

Each of the dies 106 and 107 may comprise magnetic sensor elements, which respond to magnetic fields in radial and tangential directions.

The die 107 may comprise Vertical Hall effect devices and Hall plates and the die 106 may comprise Vertical Hall effect devices or XMRs.

Both dies 106 and 107 may comprise exciting and detection coils for the inductive sensor system. If they are placed on the main surface of the chips, the inductive sensor on the die 107 has a stronger signal compared to the signal supplied by the die 106.

As an option, the die 106 does not have the inductive coils inside, but on a separate chip, substrate or printed circuit board (PCB). This may result in a sensor module comprising magnetic and inductive sensors. Advantageously, the coils can be arranged perpendicularly to the main surface of the chip, which reduces eddy currents in the die paddle and allows using XMR angle sensors in combination with the inductive system.

Another advantage of such module is that coils larger than the size of the chip can be used. It is also possible to use a number p2 of conductive targets with p2<p so that the conductive teeth/holes are larger than the magnetic pole, which increases the airgap-capability of the inductive system.

It is noted that the system does not necessarily need both dies 106 and 107. Instead, a single chip may suffice for some use cases. On the other hand, having two (or even more) chips with magnetic sensor elements placed at similar airgaps around the magnet 104 may improve the detection capability and resolution.

The magnetization of the poles 102b of the pole-pairs 102 may be directed predominantly radially inwards, whereas the magnetization of the poles 102a may be directed predominantly radially outwards.

It is known that an arc-shaped magnetization which bends smoothly from radially inwards to radially outwards near an North/South-transition (between the poles 102a and 102b) improves the field pattern such that the radial and tangential field components at the sensor elements vary sinusoidally versus an azimuthal coordinate.

Alternatively, the magnetization of the poles 102a and 102b may be predominantly axially with alternating sign. This supplies axial and tangential field components, which vary sinusoidally versus the azimuthal coordinate. In such case, the sensors may beneficially face the flat surface of the magnet instead of its curved surface and the target may cover the flat surface.

Figure 2:
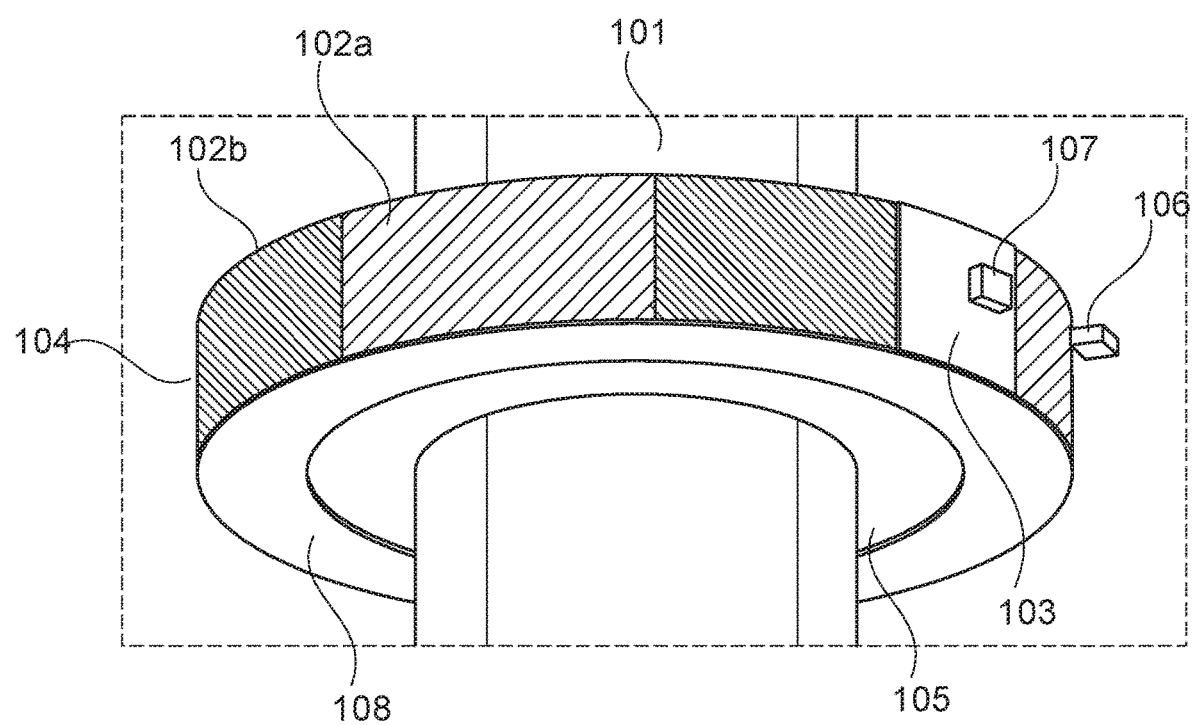
FIG. 2 shows the arrangement of FIG. 1 from below.

FIG. 2 shows the arrangement of FIG. 1 from below. It is noted that the target 103 may be connected to a structure 108; in particular, the target 103 and the structure 108 may be realized as a single piece. However, the target 103 may be coupled or connected (e.g., adhered, mounted or the like) to the magnet 104 without such structure 108.

Example

One target more (or less) than the magnet has pole pairs (p=4, p2=5)

In another example, p2 conductive targets may be used with p2 being different from the number of pole pairs p, wherein both have no common divisor.

In exemplary systems, the number of targets p2 may equal p+1 or p−1. In such case, the inductive signal shows a periodic waveform with p2 cycles per revolution. A threshold can be defined amounting to (max+min)/2, wherein max, min being a maximum value and a minimum value of this waveform.

Next, the system measures the difference in rotational angle between 180° values of φ' (which occur p times per revolution) and the rotational angle when the inductive signal exceeds (or reaches) a predefined threshold. In other words: the system measures the delay between peaks in the magnetic field and peaks in the inductive signal.

This delay changes monotonously over a full revolution. At some rotational angle of, e.g., 180° there is no delay and for the next 180° CW (clock-wise) the inductive signal may progressively lead the magnetic signal and for rotational angles slightly less than 360° this lead may be slightly less than 180°. If the rotation starts at 180° and goes CCW (counter-clock-wise), the inductive signal progressively lags the magnetic signal and for rotational angles that are slightly larger than 0° this lag may be slightly larger than 0°.

Figure 3:
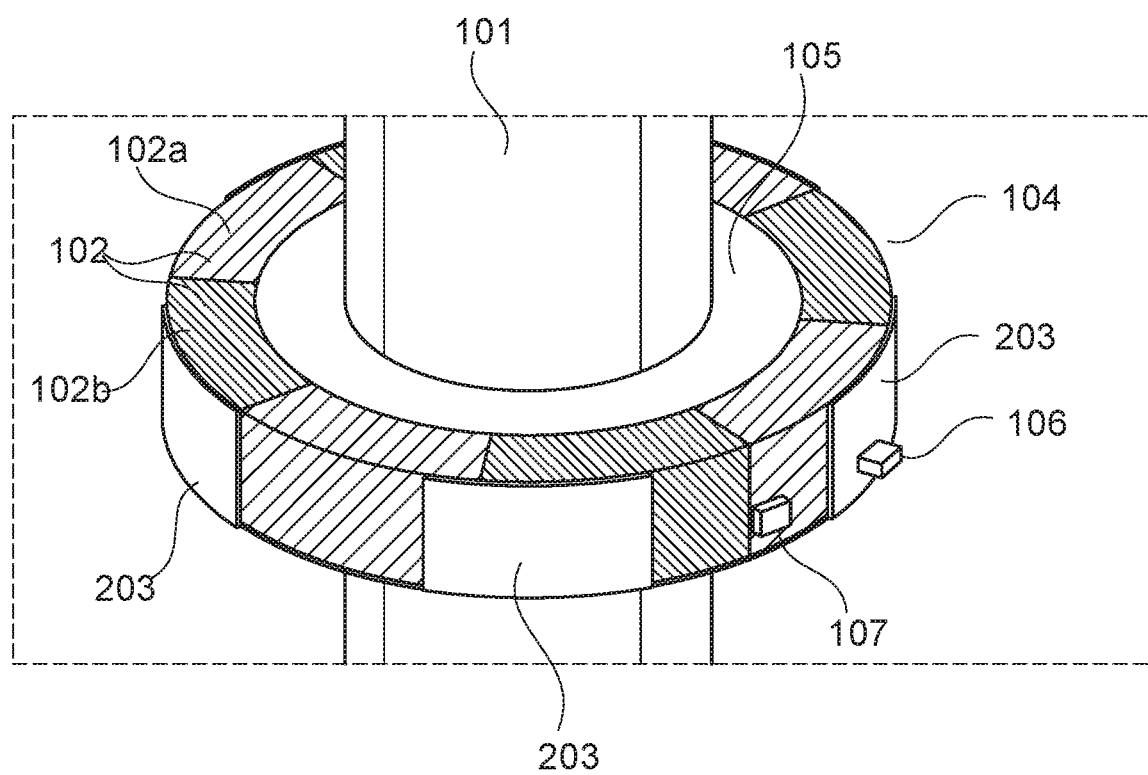
FIG. 3 shows a schematic arrangement based on FIG. 1 with several targets, wherein the targets can be realized as a single physical structure or as a multitude of physical structures.

FIG. 3 shows an exemplary arrangement with p=4 pole pairs and p2=5 inductive targets 203. Except for the targets 203, FIG. 3 corresponds to FIG. 1.

Figure 4:
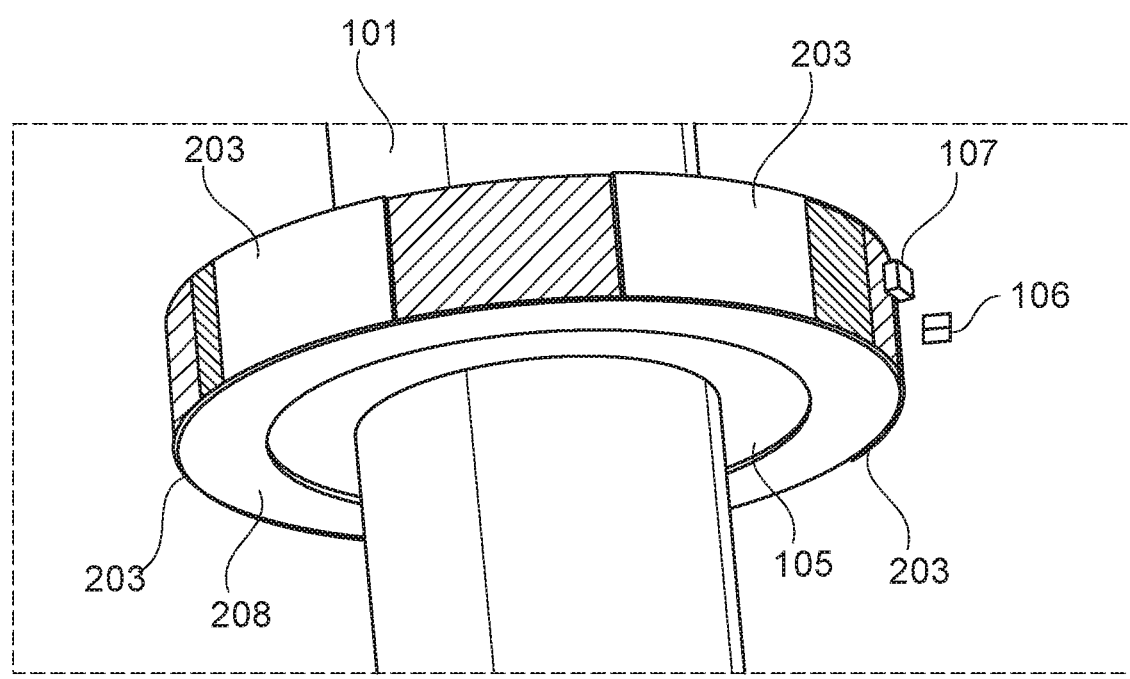
FIG. 4 shows the arrangement of FIG. 3 from below.
Figure 5:
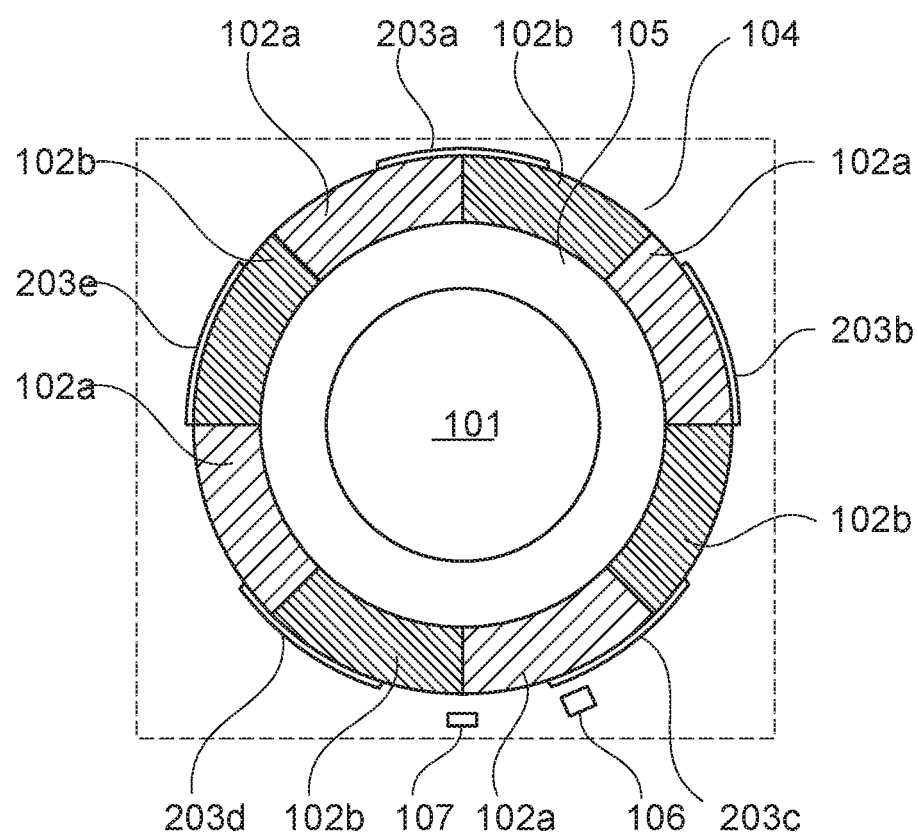
FIG. 5 shows a plan top view of the arrangement of FIG. 3 and FIG. 4.

FIG. 4 shows the arrangement of FIG. 3 from below and FIG. 5 shows a plan top view of the arrangement of FIG. 3 and FIG. 4 with p2=5 inductive targets 203a, 203b, 203c, 203d and 203e.

It is noted that the target 203a covers N- and S-poles equally, whereas the target 203e and the target 203b are aligned with a transition between the N-pole and the S-pole 102a and 102b. Further, the targets 203c and 203d unevenly cover N- and S-poles. In this example, all targets 203a to 203d are equally large and the gaps between these targets are also substantially equal in size. However, other embodiments may be utilized with targets and/or gaps of different size(s).

It is noted that the targets 203a to 203e may be connected to a structure 208; in particular, the targets 203a to 203e and the structure 208 may be realized as a single piece. As an alternative, the targets 203a to 203e may be coupled or connected (e.g., adhered, mounted or the like) to the magnet 104 without such structure 208.

Example: 2p Targets

Figure 6:
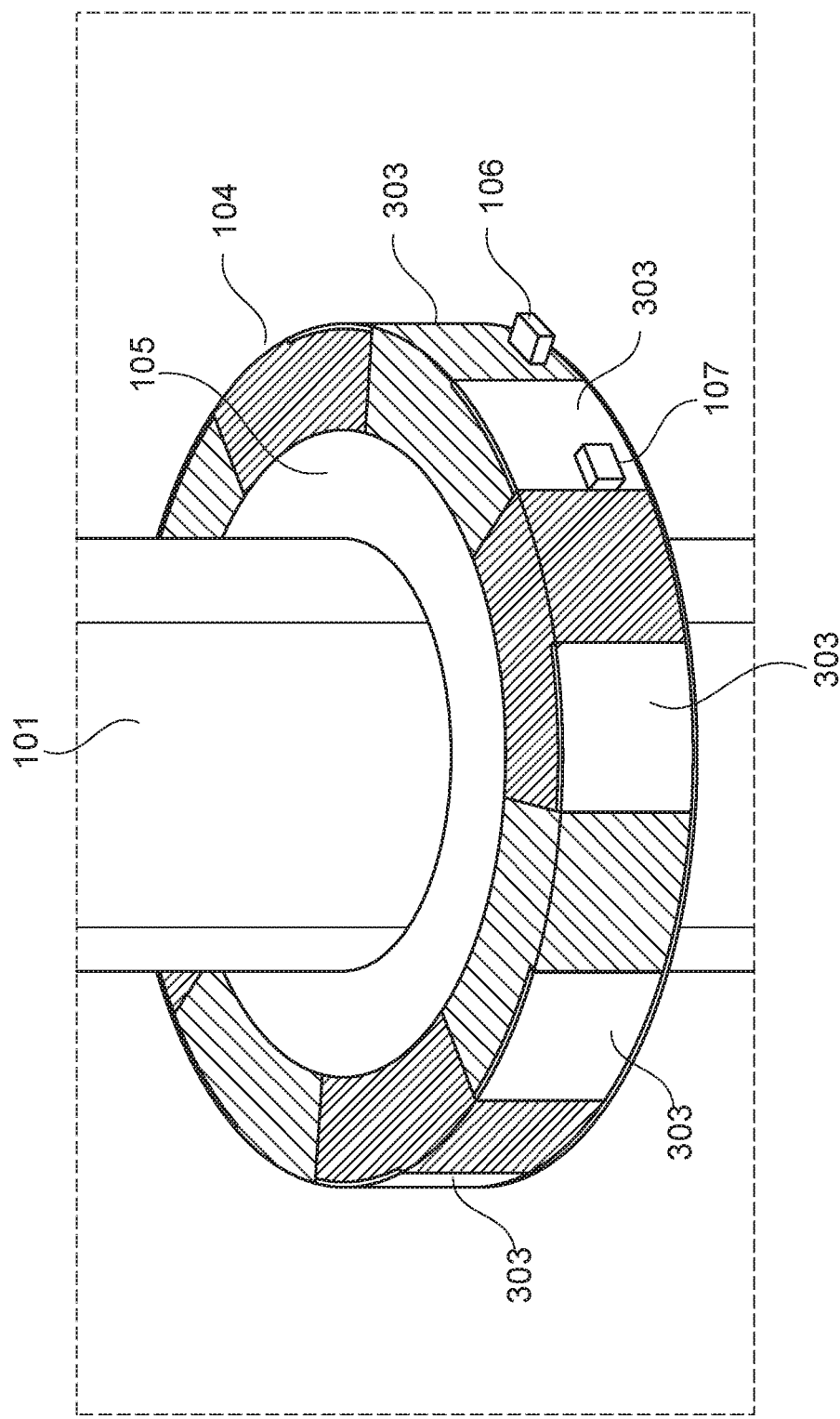
FIG. 6 shows a schematic arrangement based on FIG. 1 with as many targets as there are single poles of the multipole magnet that acts as magnetic field source.

FIG. 6 shows an exemplary arrangement with p=4 pole pairs and p2=8 inductive targets 303. Except for the targets 303, FIG. 6 corresponds to FIG. 1.

In this example, there are as many targets as there are poles. The magnet 104 has p=4 pole pairs and 8 single poles 102a and 102b. Per pole a target 303 is applied to the magnet 104.

The targets 303 may be molded into the magnet 104 such that the outer curved surface is substantially smooth. This may result in a uniform (smooth) outer diameter of the magnet 104 including the targets 303.

Each pole of the magnet 104 has one target. The targets may be aligned such that their edges coincide with the transitions between the N- and S-poles of the pole-pair. However, the location of the targets may also be shifted tangentially.

Because of the placement of the targets 303, half of each magnet pole has a smaller outer diameter than the other half of the magnet pole. This may result in an airgap-modulation and a small distortion of the magnetic field. If the conductive targets are shifted by a quarter of a pole size in tangential direction (CW or CCW), this distortion of the magnetic field may be more symmetric, which increases the accuracy of the magnetic subsystem.

Further Examples and Considerations

It is noted that the embodiments shown and explained herein are merely examples and different combinations of targets and poles (pole pairs) can be used accordingly. It is in particular an option to have a first number of targets applied to a second number of magnetic poles, wherein the first number may differ from the second number.

In an exemplary embodiment, a single (small) target can be used in combination with a large number (e.g., 10) of magnetic pole pairs (i.e. 20 magnetic poles).

It is another option to have as many targets as magnetic pole pairs, wherein each target may be associated with a single magnetic pole pair (e.g., it may cover a portion of the magnetic pole pair).

It is yet an embodiment that half the targets are used with regard to the magnetic pole pairs. In this case, each second magnetic pole pair may be (partially) covered by a target.

In a further embodiment, there may be targets exceeding the number of magnetic pole pairs by one (or being one less than the number of magnetic pole pairs). This allows applying the so-called "Nonius"-principle with a different number of full cycles per revolution in the magnetic and inductive sensor signals. The combination of both signals gives a unique pattern for rotational positions ranging from 0° to 360°.

In another example, there may be twice as many targets as magnetic pole pairs. In a particular embodiment, each target may cover half the size of a single magnetic pole; the target may be glued to the outside surface of the magnet.

It is a further option that several targets are provided for a single dipole magnet.

It is also an option that the magnet is small in size and that such magnet is applied to a target. In such scenario, the magnet may indicate a 0° position and the p2 targets may allow detecting the angle 360°/p2.

Combination of Magnetic and Inductive System

The magnetic system and the inductive system may each provide a signal, referred to as magnetic signal and inductive signal. In an exemplary embodiment, the zero crossings of both signals may be compared: The inductive system (in this example) may have only two zero crossings per revolution (due to its single target) and this zero crossing can mark the 0° reference position from where the system starts counting the magnetic pole-pairs via the magnetic angle sensor.

After power down, the system has to wait until the single target passes the inductive detection coil thereby marking the reference position and letting the system become aware of its absolute angle position.

In another embodiment, p2 targets and p magnetic pole-pairs may be provided with $p2 = p \pm 1.$ It is noted that the p2 targets may advantageously be evenly distributed across the magnet. The sizes of the gaps between the targets may have substantially the same size. However, it is an option that the gaps may be larger or smaller than the targets.

The system may compare the angles for zero crossings of magnetic and inductive signals. These crossings coincide for 0°. The inductive zero crossings lead progressively for positive angles amounting from 0° to 180° and it lags progressively for angles amounting from 0° to −180°. For ±180° this lead/lag is as large as one magnetic pole or one inductive target (whichever is smaller).

As an option, an inductive system as described in M. Podhraski, J. Trontelj: A Differential Monolithically Integrated Inductive Linear Displacement Measurement Microsystem, Sensors 2016, 16, 394 (www.mdpi.com/journal/sensors), the disclosure of which is incorporated by reference herein, may be used.

Figure 7:
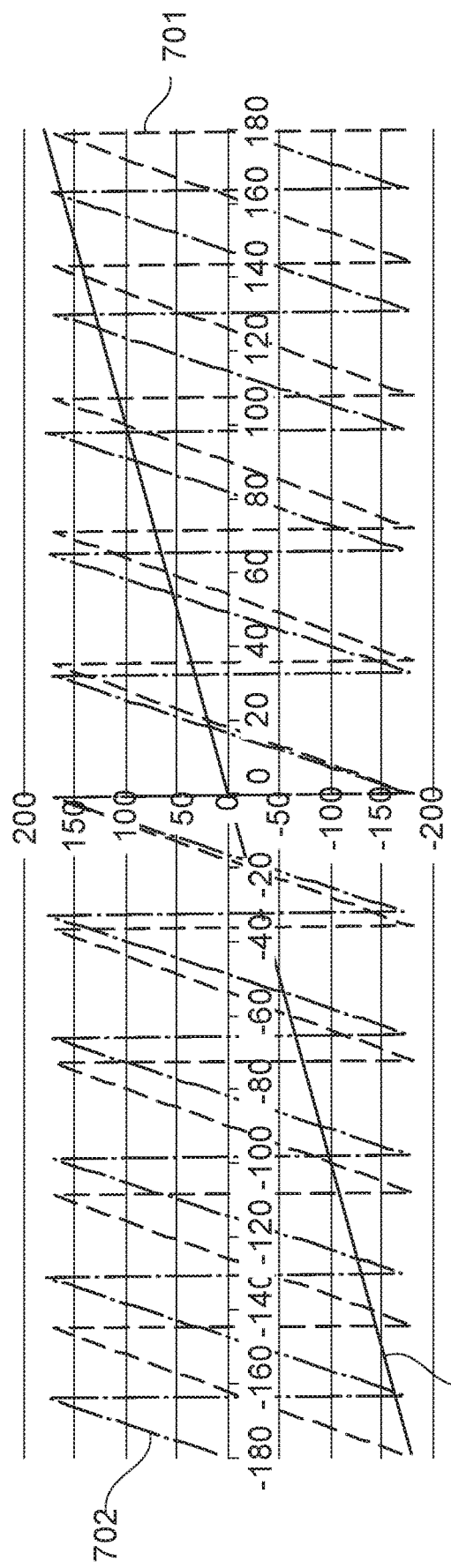
FIG. 7 shows an exemplary diagram comprising a magnetic angle, an inductive angle and a difference 703 which is a function of the global position (i.e. the rotational angle) of the shaft.

FIG. 7 shows an exemplary diagram (for p=10 magnetic poles and p2=11 targets) comprising a magnetic angle 701 and an inductive angle 702. Both angles 701 and 702 can be compared and their difference 703 is a function of the global position (i.e. the rotational angle) of the shaft.

The difference 703 can be computed as follows:

$d = \arctan2(\cos\alpha \cdot \cos\beta + \sin\alpha \cdot \sin\beta;\ \sin\alpha \cdot \cos\beta - \cos\alpha \cdot \sin\beta),$ wherein
  $\alpha$ is the magnetic angle,
  $\beta$ is the inductive angle,
  arctan 2 is the arctangent function as, e.g., defined in MS Excel™.

Each pole-pair of the magnetic system covers an angle of 360°/10=36° and the period of the inductive target (i.e. one tooth and one gap) may cover an angle amounting to 360°/11=32.73°.

Variations of Inductive (and Magnetic) Subsystems

The inductive target does not have to share a single surface with the magnetic sensor. Instead, it may be located on a different surface of the magnet.

Figure 8:
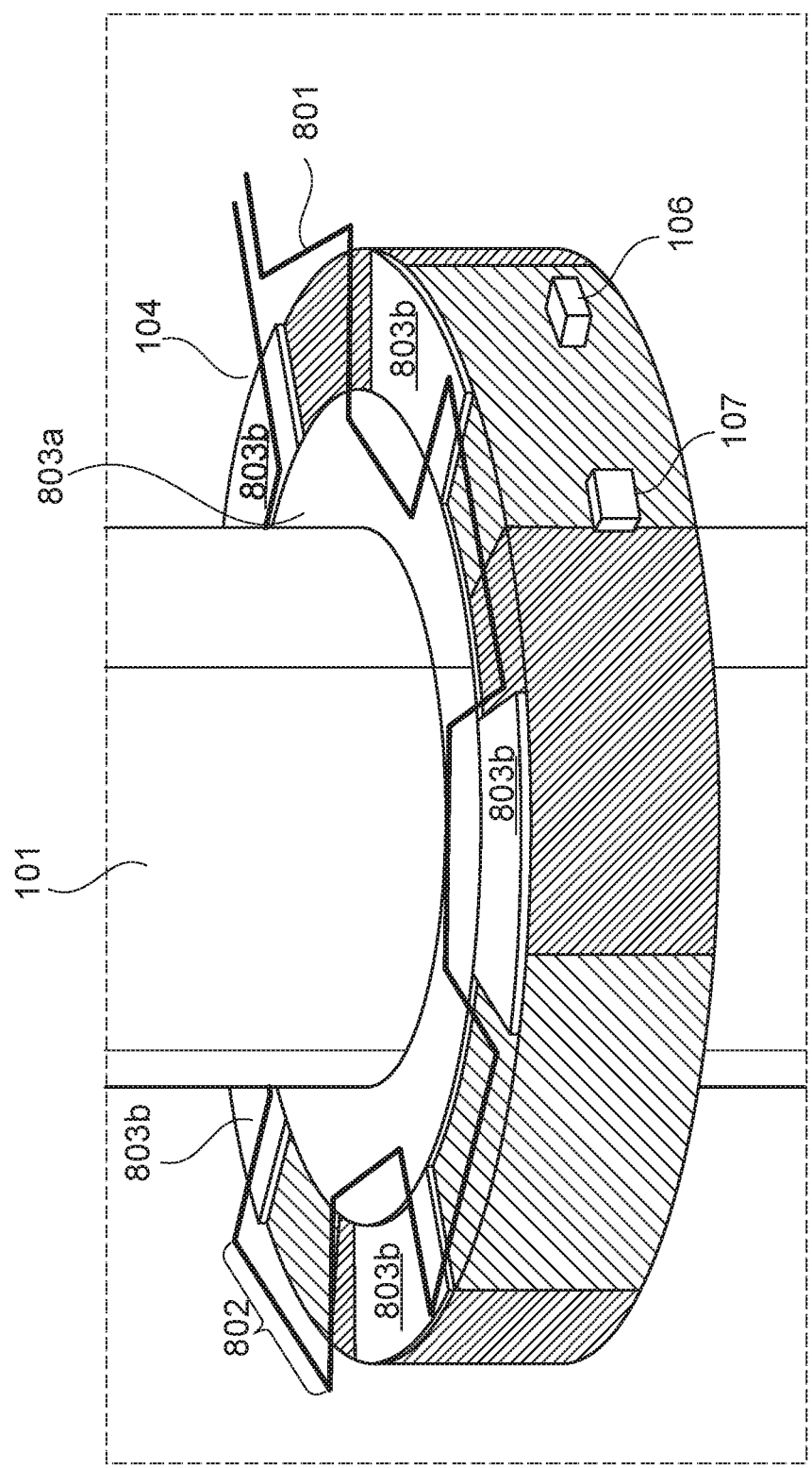
FIG. 8 shows a schematic arrangement comprising a multipole magnet, that is mechanically coupled to a shaft, which is rotatable around a rotation axis, and a conductive target (also referred to as "target") that is located on the top surface of the multipole magnet.

FIG. 8 shows an exemplary arrangement with p=4 pole pairs and an inductive target 803a, 803b that is located on the top surface of the magnet 104.

The dies 106 and 107 may be magnetic sensor devices that face the outer drum surface of the magnet 104. Also, a coil 801 is provided, which may encircle the shaft 101 to cover at least a portion of the inductive target 803a. As an option, the coil 801 may be arranged such that it overlaps with the top surface of the magnet 104.

The coil can be a pick-up coil or an excitation coil or both at the same time. It can be supplied by the sensor circuit with AC electric energy of several MHz, which generates a magnetic field on the target thereby inducing eddy currents in the target. These eddy currents generate a secondary magnetic field which may induce a voltage in the pick-up coils. This voltage can be detected directly by the sensor circuit or it can lead to a shift in the impedance of the coil or in its resonance frequency, both of which can be detected by the sensor circuit.

The coil 801 is stationary in view of the rotating shaft 101 (and the rotating magnet 104, which is directly or indirectly attached to the shaft 101).

The coil 801 has two terminals and the coil 801 can be stimulated with an AC electric energy via these terminals and a voltage induced into the coil 801 can also be tapped via these terminals. Hence, the coil 801 may act as a sender and a receiver.

Other embodiments may comprise several coils, one for generating the primary AC-magnetic field, and two to detect the secondary magnetic field from the eddy currents in the target. The rotational position can be derived from the signals in these latter two coils, for example, if reference to Lin Ye, et al.: "Nonlinearity Analysis and Parameters Optimization for an Inductive Angle Sensor", Sensors 2014, ISSN 1424-8220, www.mdpi.com/journal/sensors, which is incorporated by reference herein.

The coil 801 may be supported by a substrate, e.g., a component board or printed circuit board (PCB), which is not shown in FIG. 8 for better visibility reasons. The coil 801 may be realized via conducting paths on the PCB, which may be on a single layer or it may utilize several layers on at least one side of the PCB and/or between both surfaces of the PCB.

It is noted that the coil 801 may comprise at least one winding.

It is further noted that the coil 801 may not have to encircle the whole shaft by 360°; it may also suffice to place the coil 801 such that it covers a portion of the 360° circle, e.g., merely 90°. This eases installation of the PCB comprising the coil 801, because it does not have to be arranged over the shaft 101; instead, it may simply be placed in the vicinity of the shaft 101.

It is an option to have at least two such coils that may each cover a portion of the 360° range around the shaft, e.g., two PCBs each having a coil and each of the PCBs covering an area of 90° of the 360° circle around the shaft 101.

It is another option that at least two coils are provided, which are rotated around the rotation axis of the shaft 101 against each other. For example, a meandric structure of the coil 801 can be used also for the other coil, wherein the meandric structures of both coils are shifted around the rotation axis against the targets 803b, e.g., by half of a tooth 802 or by one tooth 802. This second coil is not shown in FIG. 8.

As a further option, the meandric structure of the coil 801 may mimic a pattern of the inductive targets 803b as shown with regard to the teeth 802 in FIG. 8.

In FIG. 8, the inductive target 803a, 803b is exemplarily arranged as a single piece that is fixed on top of the magnet 104. This single piece comprises an inner ring 803a with extension (over the magnet) 803b. It is also an option, that there is no inner ring structure 803a and only several single targets 803b are provided, e.g., glued onto the top of the magnet 104.

Of course, there may only be a single target 803b or the target(s) 803b may be smaller (or larger). They may be arranged per pole-pair, per single pole or independent from the pole-pair or single pole.

The inductive target 803a, 803b may be placed on top of the magnet 104 as shown in FIG. 8. Also, it may be placed below or with a gap adjacent to the magnet 104. In one example, the inductive target 803a, 803b and the magnet 104 may be located adjacent to each other on the shaft 101.

The coil 801 shown in FIG. 8 (and/or any additional coil not shown in FIG. 8, but described above) may be placed with a small clearance next to the target 803a, 803b.

Figure 9:
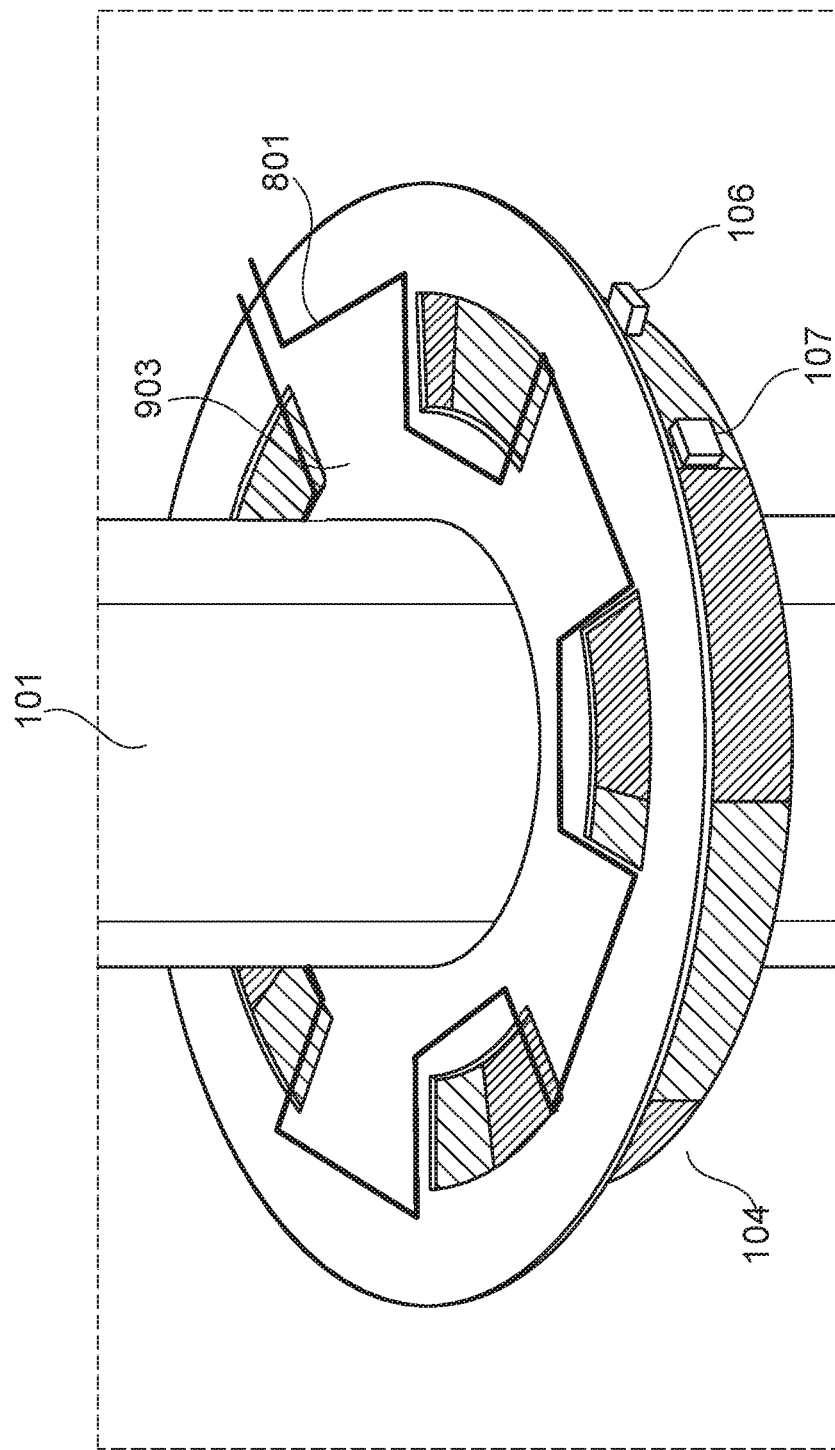
FIG. 9 shows an alternative embodiment to FIG. 8, wherein the target comprises holes.

FIG. 9 shows an exemplary arrangement with p=4 pole pairs and an inductive target 903 that is located on the top surface of the magnet 104. Contrary to the embodiment shown in FIG. 8, the inductive target 903 comprises holes. On top of the inductive target 903 (at a small distance) the (at least one) coil 801 is located. The coil 801 might be the same coil or coil structure as described with regard to FIG. 8.

According to another example, the dies 106 and 107 (which are used as magnetic angle sensor) may be located on the same substrate (e.g., PCB) as the coil 801. In such scenario, the dies face the flat top (or bottom) side of the magnet 104.

Figure 10:
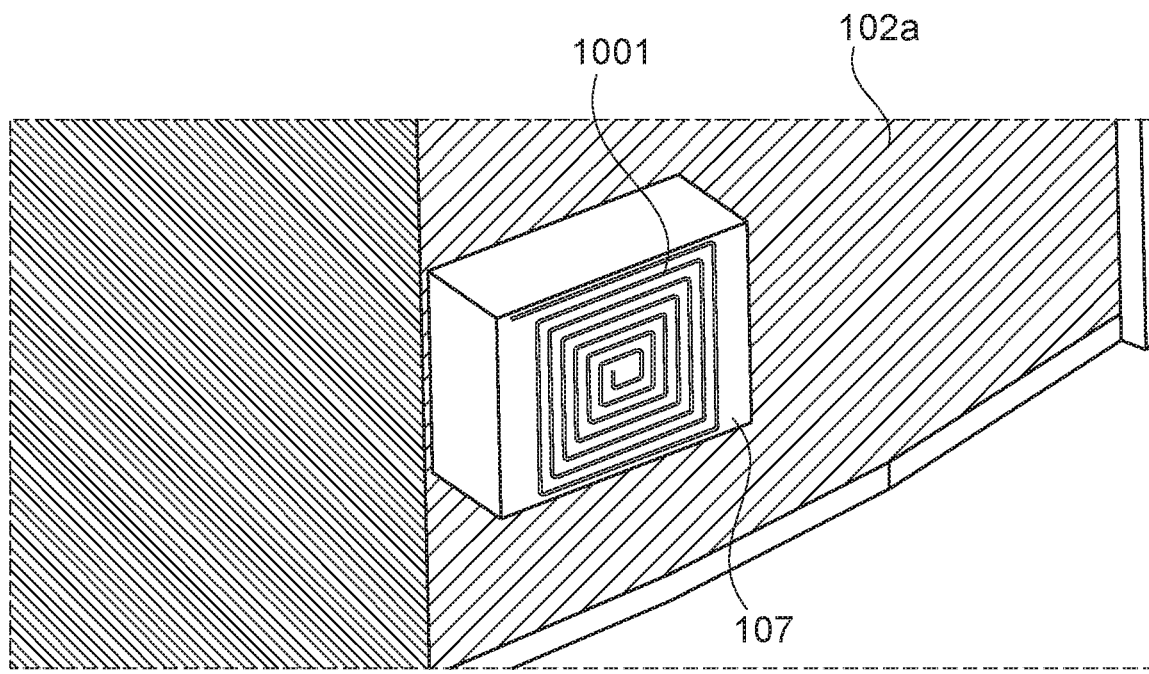
FIG. 10 shows an extract of FIG. 3, wherein the die (chip) comprises at least one coil.

It is also an example that at least one coil is integrated in one of the dies 106 and/or 107 of FIG. 3. FIG. 10 shows an extract of FIG. 3 with the die 107 having a coil 1001. The article [M. Podhraski, J. Trontelj: A Differential Monolithically Integrated Inductive Linear Displacement Measurement Microsystem, Sensors 2016, 16, 394 (www.mdpi.com/journal/sensors)] shows in FIG. 3 and FIG. 4 a single chip with several coils.

The coil 1001 is depicted on the surface of the die 107 facing away from the shaft 101. In fact, the coil 1001 may be placed close to the target and it may in particular be located such that it faces the magnet, target pointing towards the rotation axis.

The coil 1001 may be realized in different ways. For example, at least one coil or more than one coil can be used per die 107. It is also an option to use coils with similar or equal effective areas but opposite winding directions. This would allow cancelling out homogenous time varying magnetic interferences.

What is described with regard to the die 107 an be applied for the die 106 as well, in particular at least one coil may be arranged in, on or at the die 106.

Advantageously, the coil 1001 (or the several coils if there are many) may beneficially be rather large compared to the size of the target, because this will result in clearer readings. It is also an option to place at least one coil on a separate substrate (e.g., a glass platelet or a redistribution layer in a module), which may be different from the die 107 (or 106), which can then be used exclusively as magnetic angle sensor. In such case the magnetic angle sensor as well as the (separate) coil substrate may be assembled in one plastic package. It is an option to either glue the magnetic angle sensor to the coil substrate or vice versa. It is another option to glue both, the magnetic angle sensor and the coil substrate to another substrate or to a leadframe.

Figure 11:
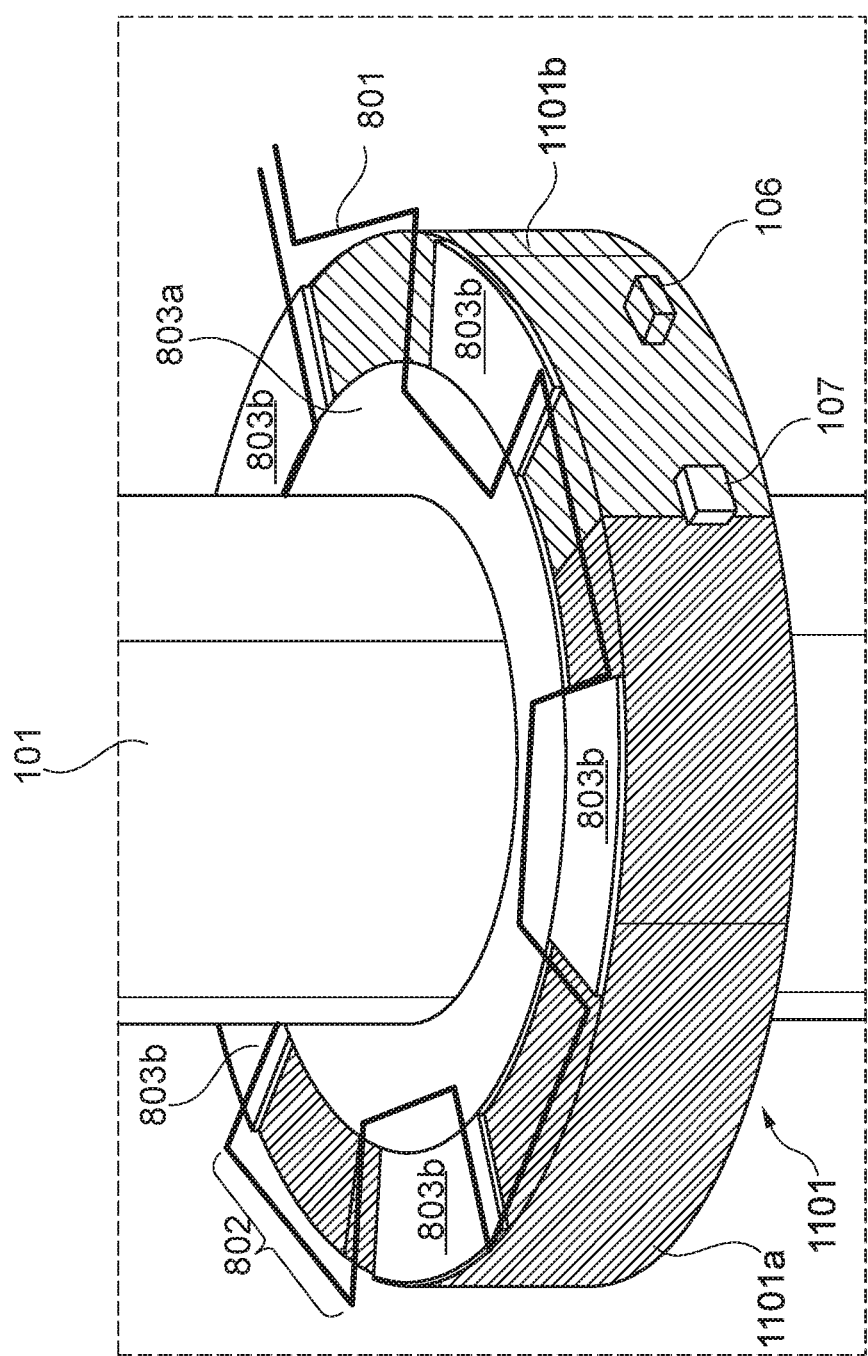
FIG. 11 shows an exemplary embodiment similar to FIG. 8, wherein a dipole magnet is used instead of the multipole magnet shown in FIG. 8.

FIG. 11 shows an exemplary embodiment similar to FIG. 8; however, the magnet 1101 of FIG. 11 has only one pole-pair (also referred to as dipole magnet) comprising a magnetic pole 1101a and a magnetic pole 1101b.

The magnetization may be diametrical or axial or a combination of both. In this example, the inductive part is the main system which provides angle readouts with high accuracy yet with a periodicity of 5 periods per revolution (based on the example shown in FIG. 11 utilizing 5 targets 803b) and the magnetic angle sensor (comprising the dies 106 and 107) assists the measurement by allowing to differentiate between $1^{st}$, $2^{nd}$, $3^{rd}$, $4^{th}$, $5^{th}$ period of the target 803a/803b.

It is noted that the target (also referred to as conductive target or target structure) may be a single piece or it may comprise several pieces (in such case, each piece may also be referred to as target).

The conductive target does not have to be attached to the magnet; it may suffice to have the conductive target coherently rotate with the magnet. This may be achieved, e.g., by fixing the magnet and the target to the (common) shaft. However, it is advantageous if both are attached together or to the same holder, which increases the accuracy of their relative alignment (between 0.1° and 5°).

The target may preferably be of high electric conductivity and have low magnetic susceptibility, i.e. its relative permeability $\mu_r$ may advantageously be in the range between 0.9 and 1.1. For example, aluminum or copper may be used as materials for or as portions of the target. Low magnetic susceptibility is advantageous, because then the target does not interfere with the DC magnetic field of the permanent magnet.

The target may be a sheet metal or it may be some tape or coating glued or sprayed to a supporting structure or to the magnet itself. Since the inductive sensor may beneficially operate at frequencies between 100 kHz and 100 MHz, preferably at 4 MHz, the AC field of the exciting coils may not penetrate the target deeper than roughly one to two times the skin depth. In Aluminum the skin depth is 41 µm at a frequency amounting to 4 MHz. Therefore, a target thickness amounting to 41 µm may suffice. However, thicker targets may be chosen for reasons of manufacturability, mechanical stability, or second order effects of the electromagnetic system (e.g., lower variation of angle error versus changes in position and airgap).

It is possible to use a rigid metal as the target and to use this target as a mechanical fixture for the magnet. For example, the target can have parts which encircle the magnet to increase the mechanical stability at high rotational speed or at higher temperatures.

The magnet may be an injection molded ferrite. This is a cost effective way to obtain a magnet with strong fields. The conductivity of the magnet may be poor. In such case, the magnet may not absorb too much power from the AC-field of the inductive system. Preferably, the shape of the magnet is rotationally symmetric so that a rotation of a slightly conductive magnet would not induce unwanted signals in the pick-up coils of the inductive system.

The target can be joined to the magnet so that the surface of this compound has an uneven structure. It is also an option to injection mold the magnet around the target to obtain a smooth and uniform surface.

The inductive system may comprise differential coils. For example, the inductive system may comprise two coil subsystems with identical turn-areas (i.e. product of number of turns and area of each turn), both subsystems connected in series but one flipped versus the other and placed aside so that a homogeneous alternating (AC) magnetic field does not induce any signal in the total coil system. Differential coils have lower electromagnetic emission than non-differential coils.

The inductive system may be run with a signal having an AC frequency in the range from 1 kHz to 1000 MHz. It may be chosen such that it matches parameters of capacitances and coils in integrated circuit technology (e.g. silicon CMOS technology). The signal of the AC may be sinusoidal or it may be pulse shaped. The frequency may be fixed or it may alter periodically or according to a (pseudo-) random pattern.

The system becomes particularly cost efficient if the magnetic sensor and the inductive subsystem comprise circuits for signal conditioning, calibration and angle computation. It may in particular be advantageous to have them implemented in a single chip/die using standard CMOS silicon technology. This chip may also comprise a memory to store, e.g., the numbers of the pole-pairs p and/or the number of targets p2.

In such an integrated system the inductive system may detect a spacing (clearance, airgap) between the target and the sensor chip. This information about the spacing can be used to calibrate the magnetic angle sensor, because the magnetic angle and/or magnitude of the magnetic field may change as a function of spacing between magnet and magnetic field sensing elements.

Other distances like, e.g., an eccentricity of the magnet and the target with regard to the rotation axis can be detected by the magnetic angle sensor and this information can be used to calibrate the inductive angle sensor. This may be advantageous to adapt the permanent magnet such that it is more sensitive to some misalignment or position/assembly error: this is in particular favorable if the magnetic system assists, e.g., to obtain 360° uniqueness, but does not require a higher degree of accuracy. In such case, the magnetic system acts as assisting system for the inductive system (which in this example acts as the main system). Hence, the magnetic system may be used for coarse angle sensing and for determining assembly errors in order to calibrate the inductive (main) system. Of course, the roles of inductive and magnetic system can also be reversed.

The inductive subsystem may be switched off after the reference angle has been determined. This can be triggered by the overall (main) system. With the known reference angle, full 360°-signal periods of the magnetic angle sensor can be counted. After a detection of undue electromagnetic interference, the inductive subsystem may be re-activated to reassure that the counter did not miss any pulses.

It is noted, that the roles (main system and assisting (auxiliary) system) of the magnetic system and the inductive system can be swapped.

In an exemplary embodiment, packages without leadframes or other large conductive die-paddle may be used to improve the sensitivity of the inductive subsystem to the conductive target—particularly if exciting and/or pick-up coils are located on the die. The die-paddles may have cuts, slits or holes, they may have a fork-like shape to avoid large loops of eddy current induced in the die paddle itself.

Advantageously, all sensor elements, coils, and circuitry may be deployed on a single chip or on a small number of chips. The single chip or the small number of chips may be arranged in a single package. It is in particular an advantage that the coil(s) and the magnetic angle sensor are in close proximity to each other. This allows for a suitable correlation between the signal from the magnet and the signal from the (inductive) target.

The inductive system may comprise at least one exciting coil and at least one detecting coil. They may be realized as separate coils or they may be realized as at least one (common) coil.

The target may comprise a plain piece of metal, either massive or a metal shell or foil. The target may have a pattern that may in particular be etched out or stamped out.

The target may be a coil comprising at least one wire and/or at least one conducting path with at least one loop. The target may comprise an open or a closed spiral/loop. In case of an open spiral or loop, a resistor or capacitor may be electrically connected between the open ends. Such connection may be used to tailor frequency characteristic (bandwidth, resonance frequency, quality factor or resonances) of the mutual inductive coupling between target and coil(s).

It is noted that the combination of magnetic and inductive sensor principle is favorable, because both use the magnetic field: a static portion of the magnetic field is used for the magnetic principle and a time varying portion of the magnetic field is used for the inductive principle. Both principles are rather robust against, e.g., oil, grease, moisture, or dust.

The magnet, in particular the multipole magnet, has several surfaces, e.g. flat axial end faces and curved inner and outer perimeter surfaces. The magnetic poles may be located in any one of these faces. The sensor may be positioned opposite of any surface preferably at a small clearance (distance from the surface). The conductive target may be located at this preferred surface or in the vicinity thereof.

Shafts of motors often suffer mainly from axial play and less from radial play. Therefore, the (outer or inner) curved surfaces may be used instead of the flat axial end surfaces of the magnet ring and the target ring. The magnetic poles and the target(s) are located in the drum surface of the magnet ring and the target ring. The borders between poles of the magnet and the edges of the target(s) may preferably be parallel to the rotation axis, i.e. each border is associated with a specific azimuthal angle and not with a wider azimuthal angle range, so that axial play does not move the rotational position of the border.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A rotation angle sensing device, comprising:
   a magnetic field source that is mechanically coupled to a rotatable shaft;
   at least one conductive target that is mechanically coupled to the rotatable shaft;

a magnetic angle sensor that is configured to detect a magnetic field of the magnetic field source; and at least one coil that is configured to excite an eddy current in the at least one conductive target and to receive a signal induced by the eddy current, wherein the at least one conductive target is arranged on a surface of the magnetic field source.

2. The rotation angle sensing device according to claim 1, wherein the magnetic field source is fixed on the rotatable shaft and the magnetic field source comprises at least one of:

a permanent magnet;

a ring magnet; or an injection molded ferrite.

3. The rotation angle sensing device according to claim 1, wherein the magnetic field source comprises a dipole magnet or a multipole magnet.

4. The rotation angle sensing device according to claim 1, wherein the magnetic field source and the at least one conductive target are arranged to generate one or several periods of the signal per rotation of the rotatable shaft.

5. The rotation angle sensing device according to claim 1, wherein the at least one conductive target comprises at least one of the following:

aluminum;

copper;

a sheet metal;

a plain piece of metal;

a metal shell;

a metal foil;

a coil comprising a conducting path with at least one loop;

an open spiral or an open loop; or a closed spiral or a closed loop.

6. The rotation angle sensing device according to claim 1, wherein the at least one conductive target has a low magnetic susceptibility with a relative permeability in a range between 0.9 and 1.1.

7. The rotation angle sensing device according to claim 1, wherein the at least one conductive target comprises a tape or a coating.

8. The rotation angle sensing device according to claim 1, wherein the at least one conductive target is glued or sprayed to a supporting structure coupled to the magnetic field source or to the magnetic field source itself.

9. The rotation angle sensing device according to claim 1, wherein the at least one coil comprises differential coils.

10. The rotation angle sensing device according to claim 1, wherein the at least one conductive target is aligned with a north-south transition of the magnetic field source.

11. The rotation angle sensing device according to claim 10, wherein an edge of the at least one conductive target is aligned with the north-south transition of the magnetic field source.

12. The rotation angle sensing device according to claim 10, wherein the at least one conductive target overlaps with the north-south transition of the magnetic field source such that a first portion of the at least one conductive target covers a north pole of the magnetic field source and a second portion of the at least one conductive target covers a south pole of the magnetic field source.

13. The rotation angle sensing device according to claim 1, wherein each of the at least one conductive target is aligned with a magnetic pole of the magnetic field source.

14. The rotation angle sensing device according to claim 1, wherein the magnetic angle sensor is arranged to detect a spatial direction of the magnetic field applied to it by the magnetic field source.

15. The rotation angle sensing device according to claim 1, wherein the magnetic angle sensor comprises at least one of the following:

an MR sensor;

an AMR sensor;

a GMR sensor;

a TMR sensor;

a Hall plate; or a vertical Hall effect device.

16. The rotation angle sensing device according to claim 1, wherein the at least one coil is driven by an alternating current.

17. The rotation angle sensing device according to claim 1, wherein the at least one coil includes a coil configured to excite the eddy current in the at least one conductive target and receive the signal induced by the eddy current.

18. The rotation angle sensing device according to claim 1, wherein the at least one coil incudes a first coil configured to excite the eddy current in the at least one conductive target and a second coil configured to receive the signal induced by the eddy current.

19. The rotation angle sensing device according to claim 1, wherein the magnetic angle sensor and the at least one coil are arranged in a single package.

20. The rotation angle sensing device according to claim 1, further comprising a processing device, wherein the magnetic angle sensor is configured to generate a sensor signal based on the magnetic field, and the processing device is configured to combine the sensor signal and the signal induced by the eddy current to derive a rotational angle of the rotatable shaft.

21. The rotation angle sensing device according to claim 1, wherein the at least one conductive target is mechanically coupled to and arranged on the surface of the magnetic field source.

22. The rotation angle sensing device according to claim 21, wherein the magnetic field source is a multipole ring magnet and the surface is a curved circumferential surface of the magnetic field source.

23. The rotation angle sensing device according to claim 21, wherein the magnetic field source is a multipole ring magnet and the surface is a flat surface of the magnetic field source.

24. The rotation angle sensing device according to claim 21, wherein each conductive target the at least one conductive target is aligned with a different north-south pole transition of the magnetic field source.

25. The rotation angle sensing device according to claim 21, wherein each conductive target the at least one conductive target overlaps with a different north-south pole transition of the magnetic field source.

26. The rotation angle sensing device according to claim 21, wherein each conductive target the at least one conductive target has an edge that is aligned with a different north-south pole transition of the magnetic field source.

27. A method for sensing a rotational angle of a shaft that is arranged rotatably around a rotation axis, wherein a magnetic field source is mechanically coupled to the shaft, and wherein at least one conductive target is arranged on a surface of the magnetic field source, the method comprising:

detecting, by a magnetic angle sensor, a magnetic field of the magnetic field source;

exciting, via at least one coil, a current in the at least one conductive target arranged on the surface of the magnetic field source; and receiving, by the at least one coil, a signal induced by the current.

28. The method according to claim 27, further comprising:
   combining a measure of the magnetic field and the signal induced by the current to derive the rotational angle of the shaft.

29. The method according to claim 27, wherein the at least one conductive target is mechanically coupled to and arranged on the surface of the magnetic field source.

* * * * *